(12) United States Patent
Ryoo (10) Patent No.: US 8,054,604 B2
(45) Date of Patent: Nov. 8, 2011

(54) DEVICE AND METHOD OF REDUCING INRUSH CURRENT

(75) Inventor: Ji-Yeoul Ryoo, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 432 days.

(21) Appl. No.: 12/219,736

(22) Filed: Jul. 28, 2008

(65) Prior Publication Data

US 2009/0040677 A1    Feb. 12, 2009

(30) Foreign Application Priority Data

Jul. 30, 2007    (KR) .................. 10-2007-0076402

(51) Int. Cl.
*H02H 9/08* (2006.01)
(52) U.S. Cl. ....................................... 361/93.9
(58) Field of Classification Search .................. 361/93.9
See application file for complete search history.

(56) References Cited

U.S. PATENT DOCUMENTS 6,452,766 B1 *  9/2002  Carper ........................... 361/18
7,248,026 B2 *  7/2007  Ritter ............................ 323/281

FOREIGN PATENT DOCUMENTS

| JP | 2001-057777 | 2/2001 |
| JP | 2006-014402 | 1/2006 |
| JP | 2006-288054 | 10/2006 |

* cited by examiner

*Primary Examiner* — Rexford Barnie
*Assistant Examiner* — Ann Hoang
(74) *Attorney, Agent, or Firm* — Harness, Dickey & Pierce, P.L.C.

(57) ABSTRACT

This disclosure provides a method and apparatus for reducing an inrush current inflowing from an external power source during an initial transient state. The method may include generating a first signal based on a level of internal voltage. The first signal may linearly increase or decrease, wherein the slope of the first signal may be fixed. The method may further include comparing the first signal with the reference voltage, and controlling an overcurrent prevention function based on the comparison results. An inrush current reducing device may include a reference voltage generating unit configured to compare a first signal and the reference voltage to control an overcurrent sensing gain, a gain unit configured to compare a first signal and the reference voltage to control an overcurrent sensing gain, and an overcurrent prevention signal generating unit configured to control an overcurrent prevention function based on the comparison results.

19 Claims, 10 Drawing Sheets

DEVICE AND METHOD OF REDUCING INRUSH CURRENT

PRIORITY STATEMENT

This U.S. non-provisional patent application claims the benefit of Korean Patent Application No. 2007-0076402, filed on Jul. 30, 2007, in the Korean Intellectual Property Office (KIPO), the disclosure of which is incorporated herein in its entirety by reference.

BACKGROUND

1. Field

Example embodiments relate to a soft-start control of a power conversion device, for example, to a method and apparatus for reducing an inrush current inflowing from an external power source during an initial transient state.

2. Description of the Related Art

Inrush current may refer to the maximum, instantaneous current inflowing from an external power source when a power conversion device is turned on. For example, a relatively large difference between a band-gap voltage that is internally generated and a voltage of an output capacitor of a power conversion device may exist in an initial state. As a result, a controller of the power conversion device may charge the output capacitor by a relatively large current. This relatively large current may be the result of an inrush current inflowing from the external supply source. The inrush current may have a negative influence upon the reliability of the power conversion device and peripheral circuits, for example. To reduce the effects of inrush current, a reference voltage of the controller may be linearly increased such that a difference between the reference voltage and the voltage of the output capacitor may be decreased. However, a gain and a bandwidth of the controller may be difficult to control because the gain and the bandwidth are lowered due to the relatively low voltage level in the initial state of the power conversion device.

SUMMARY

Example Embodiments provide a method and apparatus for reducing an inrush current inflowing from an external power source during an initial transient state.

The method may include generating a first signal based on a level of internal voltage. The level of internal voltage may be a band-gap reference voltage. The first signal may linearly increase or decrease, wherein the slope of the first signal may be fixed. The method may further include comparing the first signal with the reference voltage, and controlling an overcurrent prevention function based on the comparison results.

According to example embodiments, in controlling the overcurrent prevention function, an overcurrent sensing gain may be varied based on the comparing result between the reference voltage and the first signal. In varying the overcurrent sensing gain, the overcurrent sensing gain may be increased when the first signal is lower than the reference voltage. In varying the overcurrent sensing gain, the overcurrent sensing gain may be decreased when the first signal is greater than the reference voltage.

An inrush current reducing device may include a reference voltage generating unit configured to compare a first signal and the reference voltage to control an overcurrent sensing gain. The first signal may linearly increase or decrease, wherein the slope of the first signal may be fixed. The inrush current reducing device may further include a gain unit configured to compare a first signal and the reference voltage to control an overcurrent sensing gain and an overcurrent prevention signal generating unit configured to control an overcurrent prevention function based on the comparison results. The gain control unit may increase and decrease an overcurrent sensing gain based on the comparison results between the reference voltage and the first signal According to example embodiments, the gain control unit may increase the overcurrent sensing gain when the first signal is lower than the reference voltage. The gain control unit may decrease the overcurrent sensing gain when the first signal is greater than the reference voltage. According to example embodiments, the inrush current reducing device may further include a lamp-up signal generating unit. The lamp-up signal generating unit may generate the first signal.

According to example embodiments, the inrush current reducing device may further include an output voltage sensing unit. The output voltage sensing unit may generate the first signal based on an output signal that is controlled by using the overcurrent prevention function.

A power conversion device for reducing an inrush current may include a reference voltage generating unit configured to generate a reference voltage and a band-gap reference voltage; a lamp-up signal generating unit configured to generate a first signal based on the band-gap reference voltage; a current sensing unit configured to generate a current sensing signal; a gain control unit configured to compare the first signal and the reference voltage to control an overcurrent sensing gain and to generate an output voltage based on the comparison and the current sensing signal; an overcurrent prevention signal generating unit configured to control an overcurrent prevention function; and a power switch and driver circuit unit configured perform a switching operation in response to gate drive signals.

Consequently, according to the example embodiments, a power conversion device becomes more reliable and peripheral circuits may stably operate by reducing the inrush current received from the external power source.

BRIEF DESCRIPTION OF THE DRAWINGS

The above and other features and advantages will become more apparent by describing in detail example embodiments thereof with reference to the attached drawing in which.

DESCRIPTION OF EXAMPLE EMBODIMENTS

Example embodiments of the present application now will be described more fully with reference to the accompanying drawings, in which example embodiments of the present application are shown. The present application may, however, be embodied in many different forms and should not be construed as limited to the embodiments set forth herein. Rather, these example embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
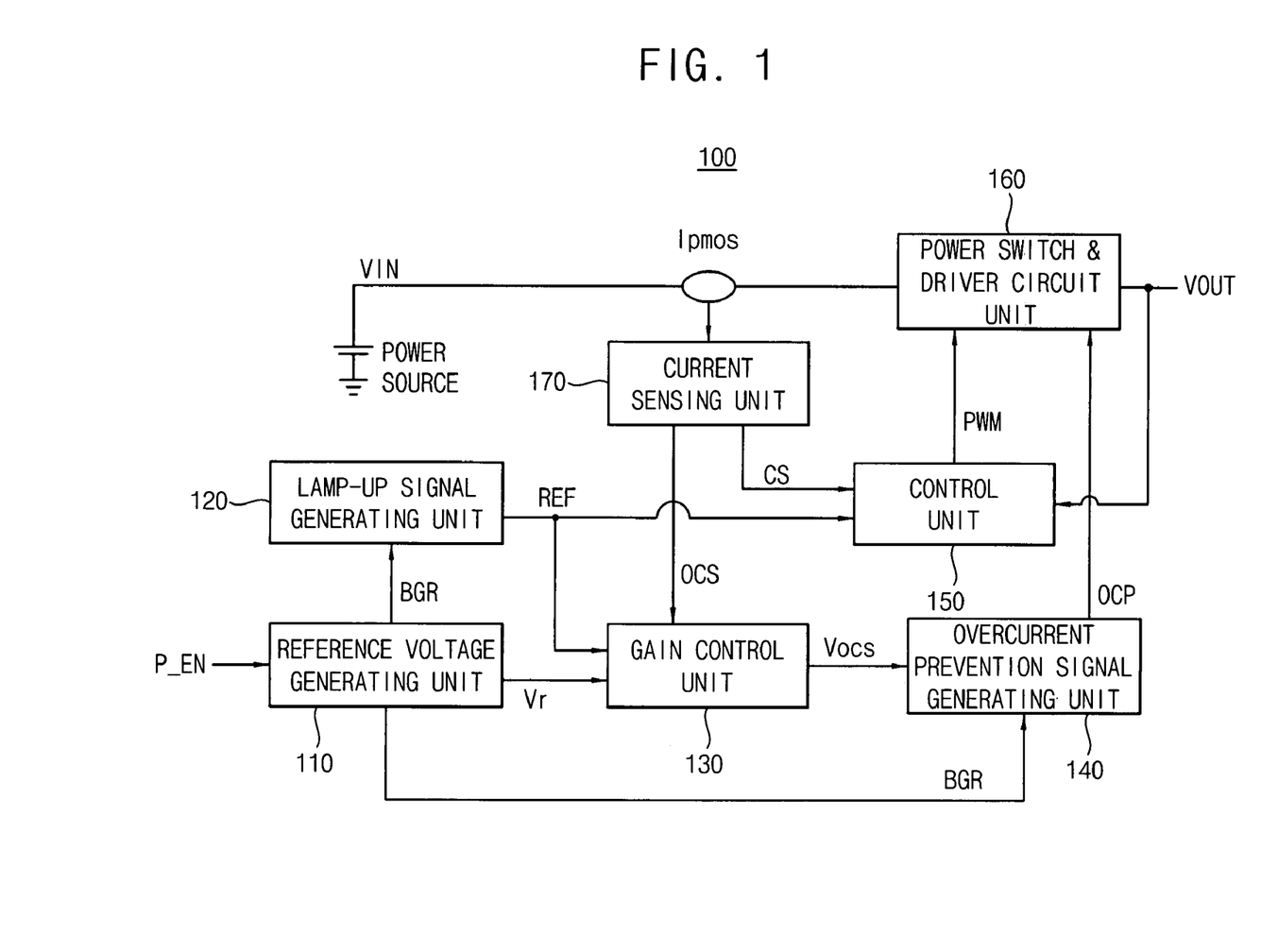
FIG. 1 is a block diagram illustrating a power conversion device according to a first example embodiment.

FIG. 1 is a block diagram illustrating a power conversion device 100 according to a first example embodiment.

The power conversion device 100 may be a DC-DC converter, for example. The power conversion device 100 may generate a DC output voltage VOUT that may be lower than a DC power supply voltage VIN. The power conversion device 100 may generate various reference voltages based on a band-gap reference voltage BGR and may stabilize the DC power supply voltage VIN to generate the stabilized DC output voltage VOUT.

Referring to FIG. 1, the power conversion device 100 may include a reference voltage generating unit 110, a lamp-up signal generating unit 120, a gain control unit 130, an overcurrent prevention signal generating unit 140, a control unit 150, a power switch and driver circuit unit 160, and a current sensing unit 170. An inrush current reducing device according to example embodiments may include the reference voltage generating unit 110, the gain control unit 130, the overcurrent prevention signal generating unit 140, and the lamp-up signal generating unit 120.

Referring to FIG. 1, the reference voltage generating unit 110 may generate the band-gap reference voltage BGR and the reference voltage Vr in response to a power enable signal P_EN. For instance, if the power enable signal P_EN transitions from a logic low state ("0") to a logic high state ("1"), the reference voltage generating unit 110 may generate the band-gap reference voltage BGR and the reference voltage Vr. It is noted that the assigned logic values are for explanatory purposes only, where the reverse situation may be within example embodiments of the present application.

The lamp-up signal generating unit 120 may generate a first signal REF based on the band-gap reference voltage BGR provided from the reference voltage generating unit 110. The first signal REF may linearly increase or decrease based on the band-gap reference voltage BGR, where the slope of the first signal REF may be fixed. The lamp-up signal generating unit 120 and the first signal REF will be further explained with reference to FIG. 3.

The current sensing unit 170 may generate current sensing signals CS and OCS based on a current Ipmos. The current sensing unit 170 may control the current sensing signals CS and OCS in order to increase an overcurrent sensing gain in the gain control unit 130.

The gain control unit 130 may receive the reference voltage Vr, the first signal REF, and the current sensing signal OCS. The gain control unit 130 may compare the first signal REF generated by the lamp-up generating unit 20 and the reference voltage Vr generated by the reference voltage generating unit 110. The gain control unit 130 may generate a voltage output Vocs by converting the current sensing signal OCS based on the comparison. The gain control unit 130 may output the voltage output Vocs to the overcurrent prevention signal generating unit 140. The gain control unit 130 will be further explained with reference to FIG. 4.

The overcurrent prevention signal generating unit 140 may compare the voltage output Vocs and the band-gap reference voltage BGR and may generate an overcurrent prevention signal OCP that may be provided to the power switch and driver circuit unit 160. The overcurrent prevention signal generating unit 140 will be further explained with reference to FIG. 5.

Figure 2:
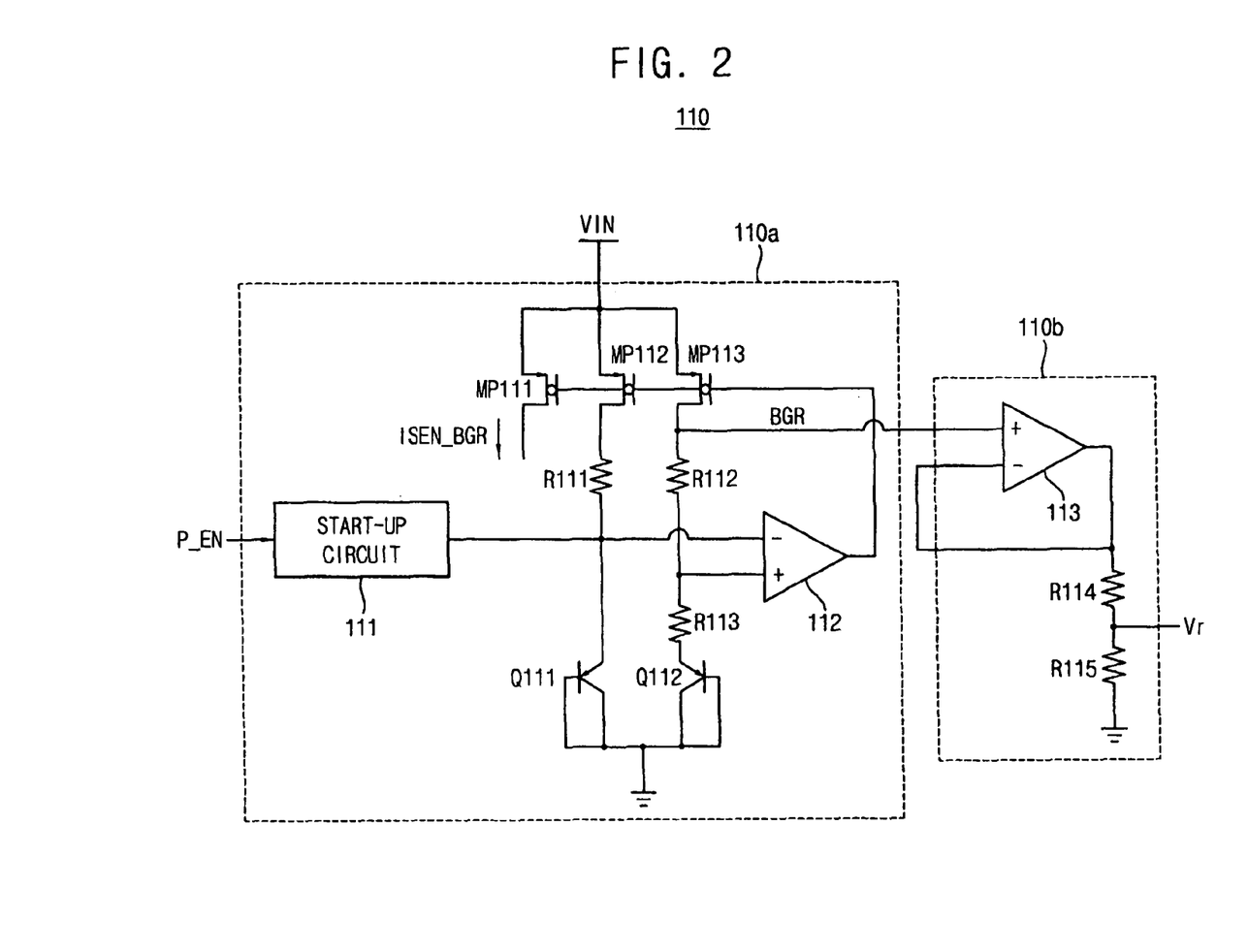
FIG. 2 is a circuit diagram illustrating a reference voltage generating unit in the power conversion device of FIG. 1 according to example embodiments.

FIG. 2 is a circuit diagram illustrating a reference voltage generating unit 110 in the power conversion device 100 of FIG. 1 according to example embodiments. The reference voltage generating unit 110 may include a band-gap reference voltage generating unit 110a and a reference voltage generator 110b.

Referring to FIG. 2, the band-gap reference voltage generating unit 110a may include a start-up circuit 111, p-type metal oxide semiconductor (PMOS) transistors MP111, MP112 and MP113, resistors R111, R112, and R113, PNP transistors Q111 and Q112, and an operational amplifier 112. The start-up circuit 111 may receive the power enable signal P_EN. In response to the power enable signal P_EN, the start-up circuit 11 may activate the band-gap reference voltage generating unit 110a. An output node of the start-up circuit 111 may be coupled to an inverting input node of the operational amplifier 112. The inverting input node of the operational amplifier 112 may be coupled between the resistor R111 and an emitter of the PNP transistor Q111. A non-inverting input node of the operational amplifier 112 is coupled between the resistor R112 and the resistor R113.

According to example embodiments, a negative feedback of the operational amplifier 112 may be dominant compared with a positive feedback of the operational amplifier 112. As a result, the band-gap reference voltage generating unit 110a may stably operate. For example, each source of the PMOS transistors MP111, MP112, and MP113 may be coupled to the DC power supply voltage VIN. Each gate of the PMOS transistors MP111, MP112, and MP113 may be coupled to the output node of the operational amplifier 112. The resistor R111 may be coupled between a drain of the PMOS transistor MP112 and the inverting input node of the operational amplifier 112. The resistor R112 may be coupled between a drain of the PMOS transistor MP113 and the non-inverting input node of the operational amplifier 112.

The emitter of the PNP transistor Q111 may be coupled to the inverting input node of the operational amplifier 112. The base and collector of the PNP transistor Q111 may be coupled to a ground voltage. The resistor R113 may be coupled between the non-inverting input node of the operational amplifier 112 and an emitter of the PNP transistor Q112. The band-gap reference voltage BGR may be output from a drain of the PMOS transistor MP113. The band-gap reference voltage BGR may be approximately 1.25V, for example. A band-gap reference current ISEN_BGR may be output from a drain of the PMOS transistor MP111. The operation of the band-gap reference voltage generator unit 110a may be well known to a person with ordinary skill in the art. Therefore, a detailed description of the operation of the band-gap reference voltage generating unit 110a in FIG. 2 will be omitted for the sake of brevity.

The reference voltage generator 110b may include an operational amplifier 113 and resistors R114 and R115. The reference voltage generator 110b may generate the reference voltage Vr in response to a level of internal voltages such as the band-gap reference voltage BGR, for example. The reference voltage generator 110b may generate the reference voltage Vr that includes a second voltage level by using the resistors R114 and R115 in response to the band-gap reference voltage BGR.

Figure 3:
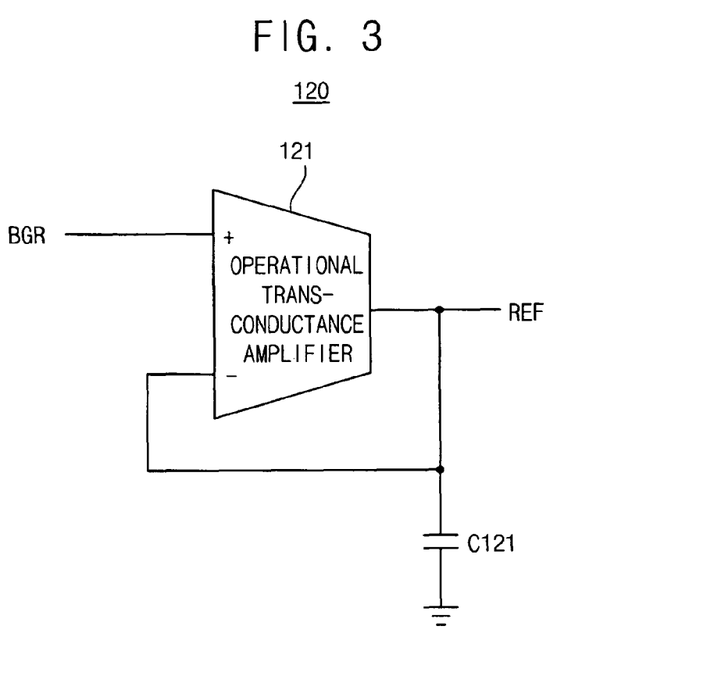
FIG. 3 is a circuit diagram illustrating a lamp-up signal generating unit in the power conversion device of FIG. 1 according to example embodiments.

FIG. 3 is a circuit diagram illustrating a lamp-up signal generating unit 120 in the power conversion device 100 of FIG. 1 according to example embodiments. Referring to FIG. 3, the lamp-up signal generating unit 120 may include an operational transconductance amplifier 121 and a capacitor C121. A non-inverting input node of the operational transconductance amplifier 121 may receive the band-gap reference voltage BGR. The output of the operational transconductance amplifier 121 may be coupled to a first terminal of the capacitor C121 and fed back to the inverting input node of the operational transconductance amplifier 121. The capacitor C121 may be charged after the band-gap reference voltage BGR is fed to the non-inverting input node of the operational transconductance amplifier 121 so that the first signal REF is generated. The first signal REF may correspond to a voltage difference between the first and second terminal of the capacitor C121. The first signal REF may linearly increase or decrease based on the band-gap reference voltage BGR. The slope of the first signal REF may be fixed.

Figure 4:
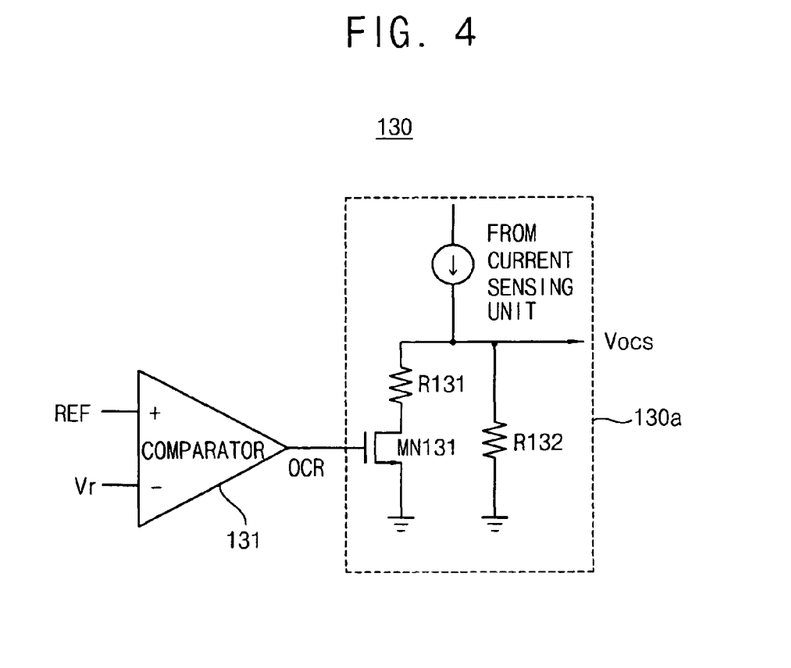
FIG. 4 is a circuit diagram illustrating a gain control unit in the power conversion device of FIG. 1 according to example embodiments.

FIG. 4 is a circuit diagram illustrating a gain control unit 130 in the power conversion device 100 of FIG. 1 according to example embodiments. The gain control unit 130 may include a comparator 131 and a voltage generating unit 130a. The voltage generating unit 130a may include an n-type metal oxide semiconductor (NMOS) transistor MN131 and resistors R131 and R132.

Referring to FIG. 4, the gain control unit 130 may convert the current sensing signal OCS to the voltage output Vocs. Also, the voltage generating unit 130a may generate and control an output voltage Vocs based on the overcurrent sensing gain. For example, the comparator may receive the first signal REF and reference voltage Vr and may generate an overcurrent control signal OCR based on a comparison of the first signal REF received from the lamp-up signal generating unit 120 and the reference voltage Vr received from the reference voltage generating unit 110.

An inrush current may be reduced according to a first soft-start control method. For example, if the first signal REF is lower than the reference voltage Vr, the overcurrent control signal OCR may have a logic low state ("0"). As a result, the NMOS transistor MN131 is turned off and the current sensing signal OCS received from the current sensing unit 170 may flow only through the resistor R132. This, in turn, may increase the overcurrent sensing gain. Because the overcurrent sensing gain of the gain control unit 130 is increased, an output voltage Vocs may approach a threshold voltage, even though a relatively small current flows through the gain control unit 130. As such, in the first soft-start control method, an overcurrent limit level may be lowered such that a switch current does not exceed a fixed current level irrespective of the pulse width modulation signal PWM from the control unit 150.

An inrush current may be reduced according to a second soft-start control method. For example, if the first signal REF is greater than the reference voltage Vr, the overcurrent control signal OCR may have a logic high state ("1"). As a result, the NMOS transistor MN131 is turned on and the current sensing signal OCS received from the current sensing unit 170 may flow through both the resistors R131 and R132. Therefore, the resistance of the parallel resistors R131 and R132 may be lowered. This, in turn, may decrease the overcurrent sensing gain such that a relatively large current flows through the p-type power MOS transistor PMP in the power switch and driver circuit unit 160. As a result, in the second soft-start method, the reference voltage of the control unit 150 may be linearly increased such that a difference between the reference voltage Vr and the voltage of the output capacitor may be decreased.

Figure 5:
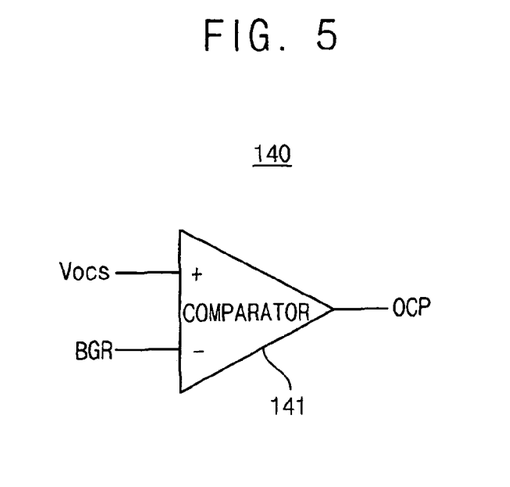
FIG. 5 is a circuit diagram illustrating an overcurrent prevention signal generating unit in the power conversion device of FIG. 1 according to example embodiments.

FIG. 5 is a circuit diagram illustrating an overcurrent prevention signal generating unit 140 in the power conversion device 100 of FIG. 1 according to example embodiments. The overcurrent prevention signal generating unit 140 may include a comparator 141. Referring to FIG. 5, the overcurrent prevention signal generating unit 140 may compare the output voltage Vocs of the voltage generating unit 130a and the band-gap reference voltage BGR to generate the overcurrent prevention signal OCP.

Figure 6:
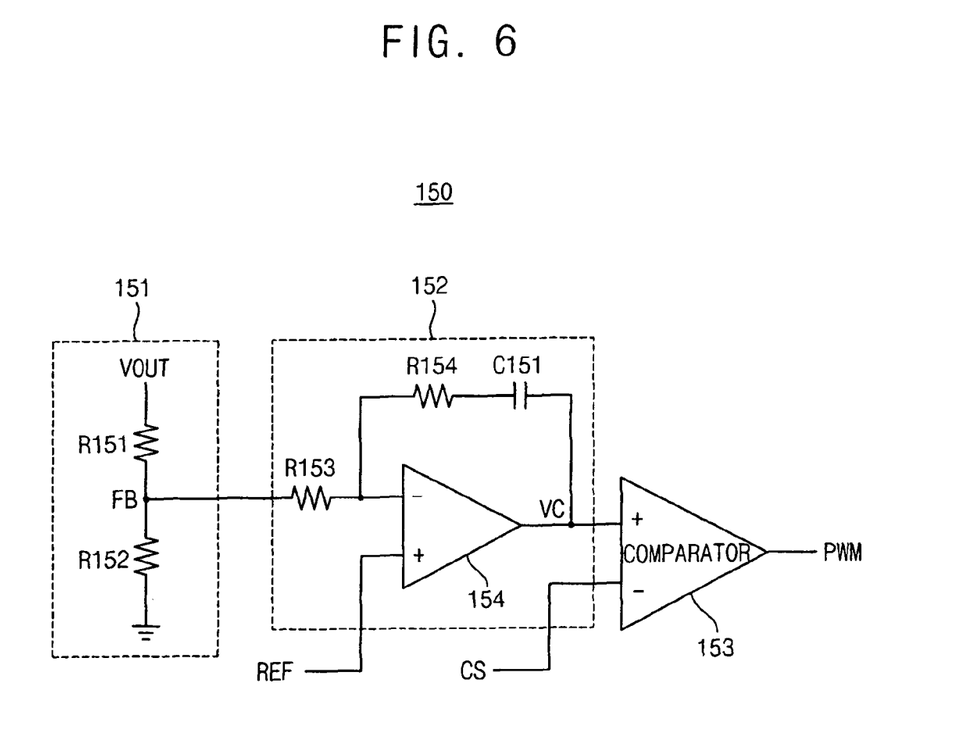
FIG. 6 is a circuit diagram illustrating a control unit in the power conversion device of FIG. 1 according to example embodiments.

FIG. 6 is a circuit diagram illustrating a control unit 150 in the power conversion device 100 of FIG. 1 according to example embodiments. The control unit 150 may receive the first signal REF, the DC output voltage VOUT, and the current sensing signal CS and may generate a pulse width modulation signal PWM.

Referring to FIG. 6, the control unit 150 may include a feedback circuit 151, a frequency compensating circuit 152, and a comparator 153. The feedback circuit 151 may include a voltage divider implemented with resistors R151 and R152. The frequency compensating circuit 152 may include an integrator implemented with resistors R153 and R154, a capacitor C151, and an operational amplifier 154.

The frequency compensating circuit 152 may receive a feedback voltage signal FB from the feedback circuit 151 and the first signal REF to generate a frequency compensated feedback voltage signal, which may be referred to as a control signal VC. The comparator 153 may compare the control signal VC and the current sensing signal CS to generate the pulse width modulation signal PWM.

Figure 7:
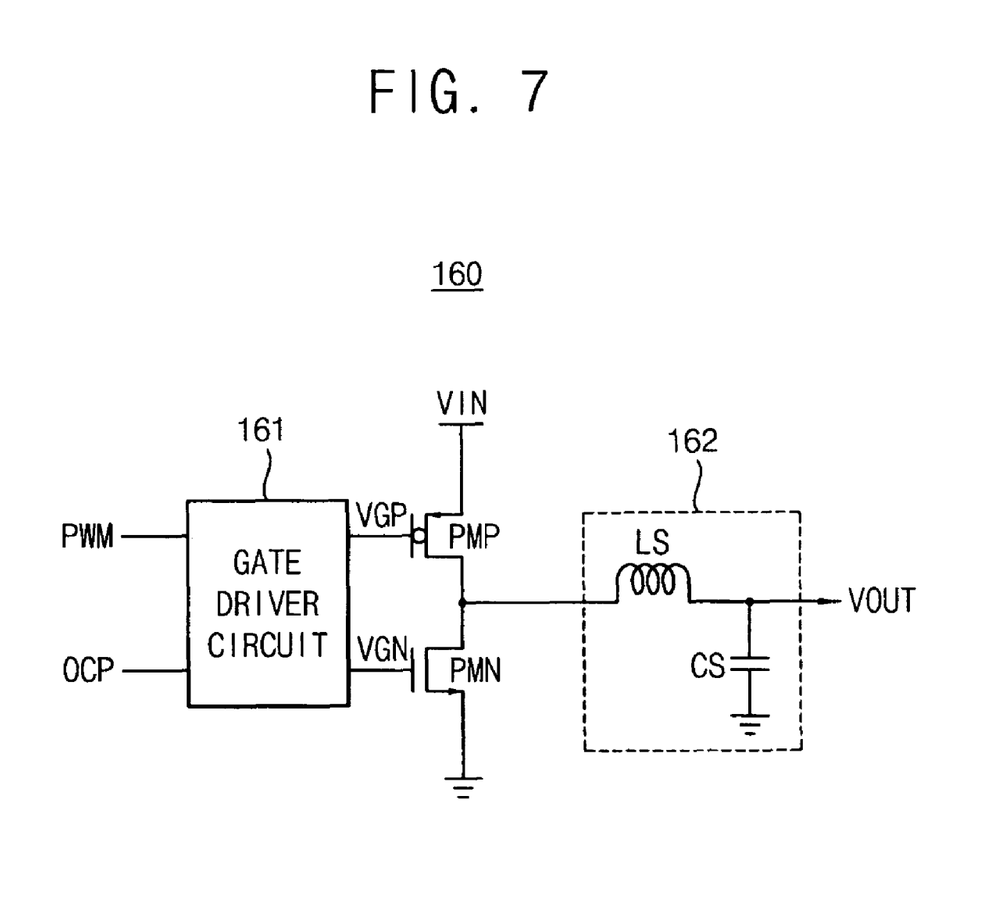
FIG. 7 is a circuit diagram illustrating a power switch and driver circuit unit in the power conversion device of FIG. 1 according to example embodiments.

FIG. 7 is a circuit diagram illustrating a power switch and driver circuit unit 160 in the power conversion device 100 of FIG. 1 according to example embodiments. Referring to FIG. 7, the power switch and driver circuit unit 160 may include a p-type power MOS transistor PMP, an n-type power MOS transistor PMN, a gate driver circuit 161, and a low-pass filter 162. The gate driver circuit 161 may include RS flip-flops. The low-pass filter 162 may generate and store electric energy, and may include an inductor LS and a capacitor CS.

The gate driver circuit 161 may generate a PMOS gate drive signal VGP and an NMOS gate drive signal VGN based on the overcurrent prevention signal OCP received from the overcurrent prevention signal generating unit 140 and the pulse width modulation signal PWM received from the control unit 150. The p-type power MOS transistor PMP and the n-type power MOS transistor PMN may perform a switching operation that provides the DC power supply voltage VIN to the low-pass filter 162 in response to the gate drive signals VGP and VGN. For instance, when the overcurrent prevention signal OCP is the logic high state ("1"), the gate driver circuit 161 may turn off the p-type power MOS transistor PMP. Also, when the gate driver circuit 161 receives the activated overcurrent prevention signal OCP, the gate driver 161 may convert the PMOS gate drive signal VGP to the logic high state ("1"), irrespective of the pulse width modulation signal PWM. As a result, the DC power supply voltage VIN is cut off and the current flowing through the inductor LS may not be increased.

When the p-type power MOS transistor PMP is turned off and the n-type power MOS transistor PMN is turned on, the current corresponding to the DC power supply voltage VIN flows to the ground electrode through the n-type power MOS transistor PMN.

When the p-type power MOS transistor PMP is turned on and the n-type power MOS transistor PMN is turned off, the current corresponding to the DC power supply voltage VIN may flow through the p-type power MOS transistor PMP, the inductor LS, and the capacitor CS.

When the n-type power MOS transistor PMN is turned off, the current may flow through an anti-parallel diode parasitically existing in the n-type power MOS transistor PMN, the inductor LS, and the capacitor CS.

Figure 8:
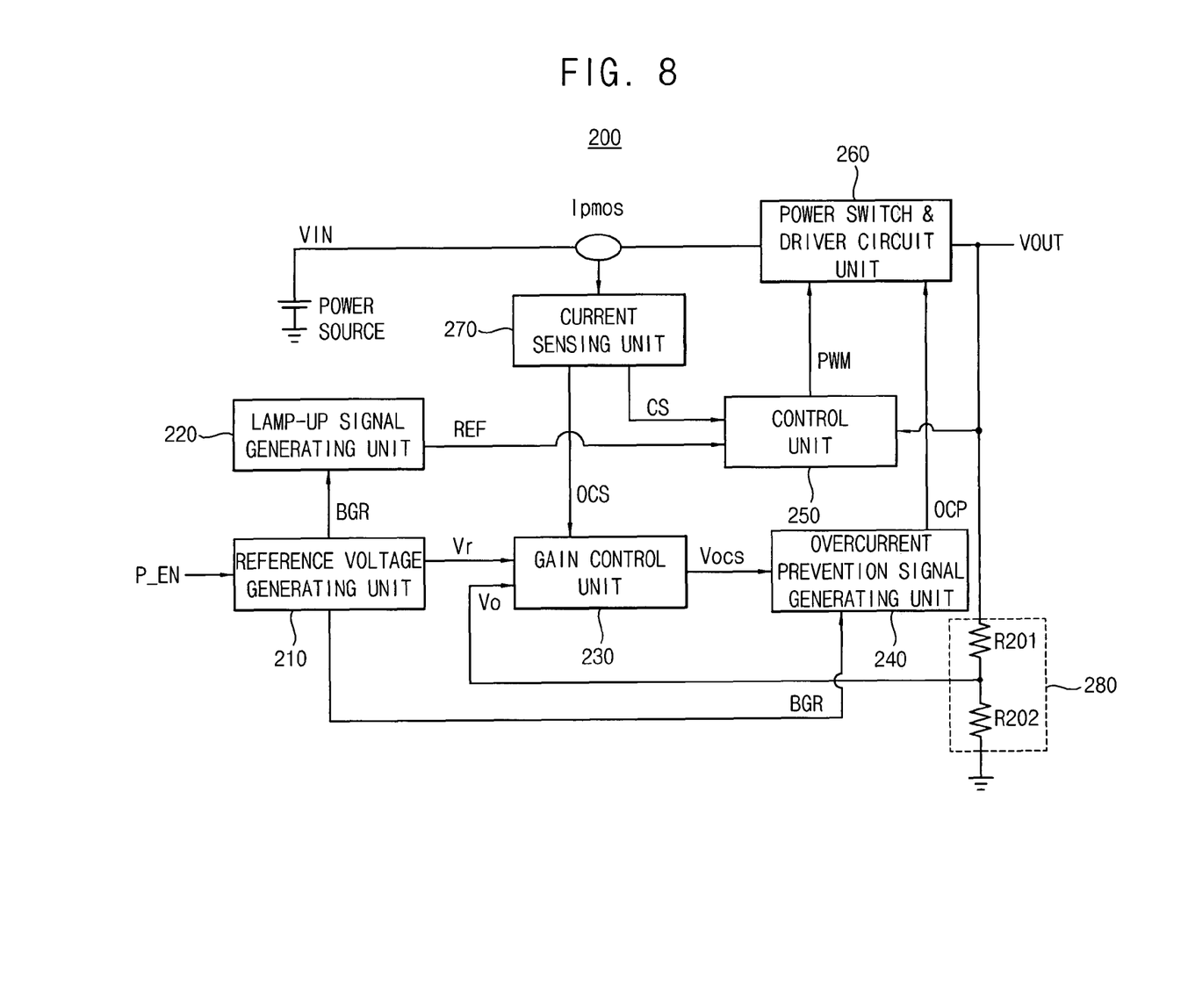
FIG. 8 is a block diagram illustrating a power conversion device according to a second example embodiment.

FIG. 8 is a block diagram illustrating a power conversion device according to a second example embodiment. A power conversion device 200 may include a reference voltage generating unit 210, a lamp-up signal generating circuit 220, a gain control unit 230, an overcurrent prevention signal generating unit 240, a control unit 250, a power switch and driver circuit unit 260, a current sensing unit 270, and an output voltage sensing unit 280. The output voltage sensing unit 280 may include a voltage divider implemented with resistors R201 and R202. An inrush current reducing device according to an example embodiment of the present invention may include the reference voltage generating unit 210, the gain control unit 230, the overcurrent prevention signal generating unit 240, and the output voltage sensing unit 280.

Compared with the power conversion device 100 of FIG. 1, the power conversion device 200 of FIG. 8 may control the overcurrent sensing gain by comparing the reference voltage Vr and a first signal Vo instead of the first signal REF generated by the lamp-up signal generating unit 220. For example, the first signal Vo may be provided by dividing the output voltage VOUT based on the resistors R201 and R202 within the output voltage sensing unit 280. The first signal Vo may be a waveform similar to the first signal REF generated by the lamp-up signal generating unit 220.

Figure 9:
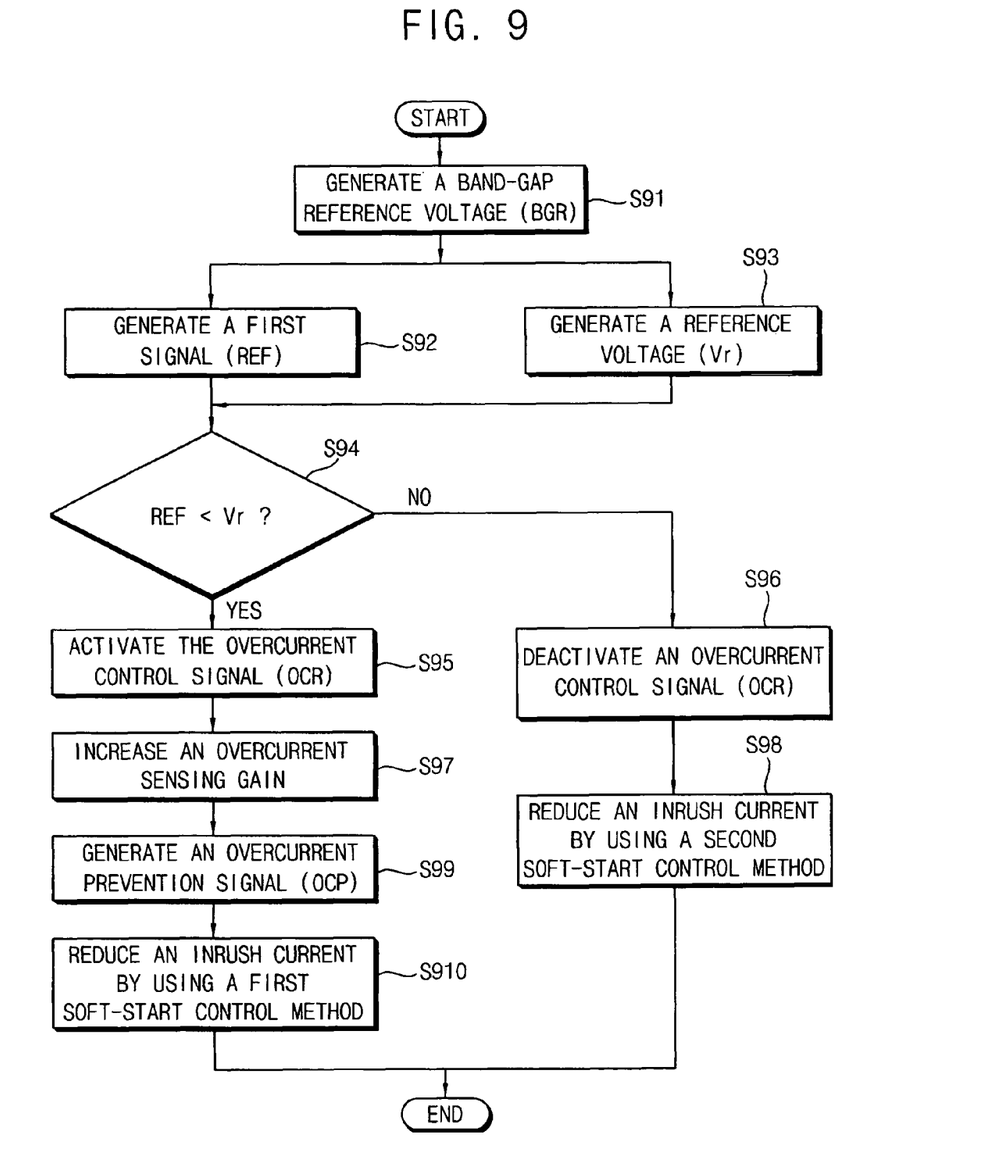
FIGS. 9 and 10 are flow charts illustrating methods of reducing an inrush current by using the soft-start control of the power conversion device according to example embodiments.
Figure 10:
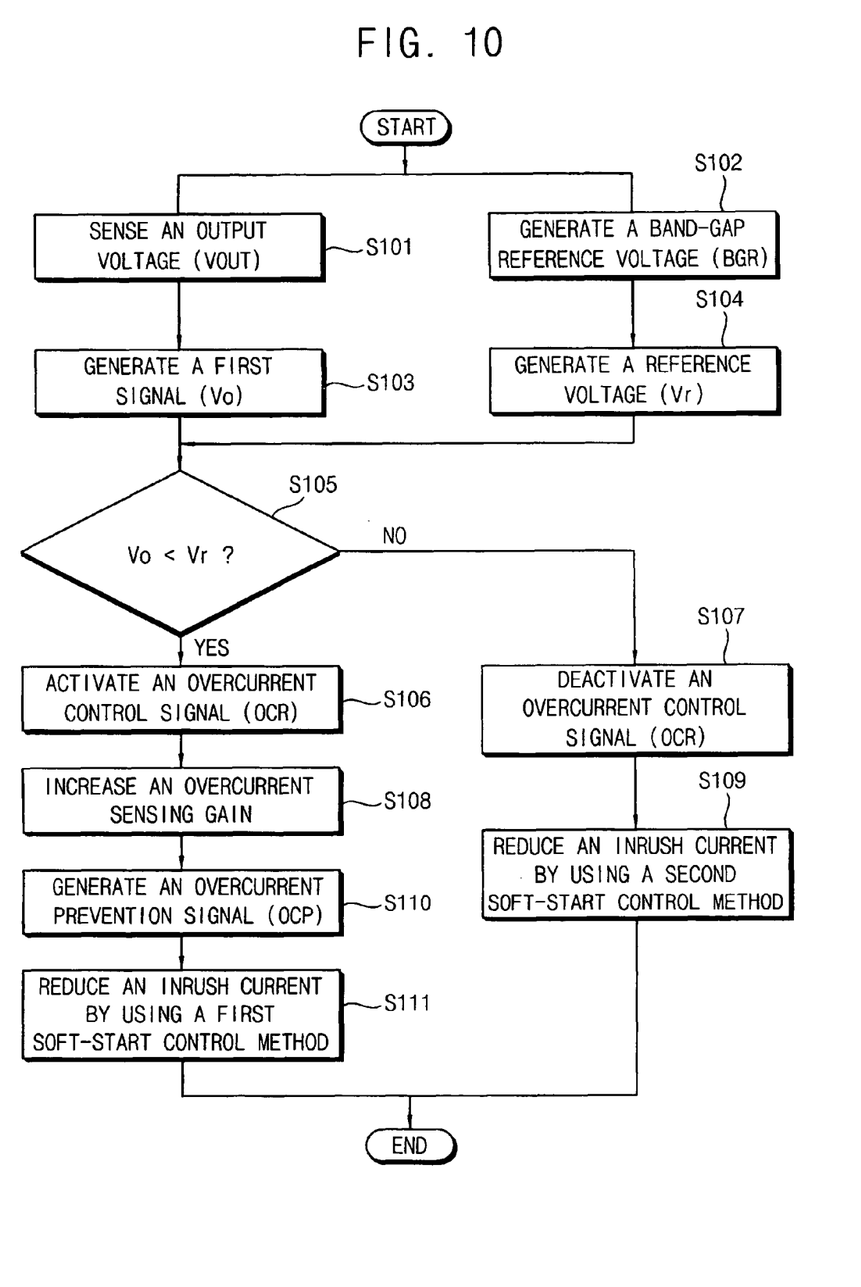

FIGS. 9 and 10 are flow charts illustrating methods for reducing an inrush current by using the soft-start control of the power conversion device according to example embodiments. FIG. 9 illustrates the soft-start control method for reducing the inrush current corresponding to FIG. 1. FIG. 10 illustrates the soft-start control method for reducing the inrush current corresponding to FIG. 8.

The soft-start control method for reducing the inrush current of the power conversion device according to the first example embodiment will be described with reference to FIG. 9. Referring to FIG. 9, in operation S91, the band-gap reference voltage BGR may be generated. In operation S92, a first signal REF may be generated based on the band-gap reference voltage BGR. The first signal REF may linearly increase or decrease based on the band-gap reference voltage BGR. The slope of the first signal REF may be fixed. In operation S93, the reference voltage Vr may be generated based on the band-gap reference voltage BGR.

In operation S94, the generated first signal REF is compared with the reference voltage Vr. If the first signal REF is lower than the reference voltage Vr (YES), the overcurrent control signal OCR may be activated (Operation S95). In operation S97, the overcurrent sensing gain may be increased according to the activated overcurrent control signal OCR.

In operation S99, the overcurrent prevention signal OCP is generated based the comparison between the output voltage Vocs and the band-gap reference voltage BGR.

In operation S910, the inrush current may be reduced by using the first soft-start control method for decreasing the overcurrent limit level such that the switch current does not exceed a predetermined fixed current level irrespective of the pulse width modulation signal PWM from the control unit.

Referring back to operation S94, if the first signal REF is greater than the reference voltage Vr (NO), the overcurrent control signal OCR may be deactivated (Operation S96).

In operation S98, the inrush current may be reduced by using the second soft-start control method such that the reference voltage of the control unit 150 may be linearly increased such that a difference between the reference voltage Vr and the voltage of the output capacitor may be decreased.

Referring to FIG. 10, the soft-start control method for reducing the inrush current of the power conversion device according to the second example embodiment will be described below.

Referring to FIG. 10, in operation S101, the output voltage VOUT is sensed. In operation S102, the band-gap reference voltage BGR may be generated. In operation S103, the first signal Vo may be generated based on the sensed output voltage VOUT. In operation S104, the reference voltage Vr is generated based on the first signal Vo. In operation S105, the first signal Vo is compared with the reference voltage Vr. For example, if the first signal Vo is lower than the reference voltage Vr (YES), the overcurrent control signal OCR is activated (Operation S106). In operation S108, the overcurrent sensing gain may be increased according to the activated overcurrent control signal OCR. In operation S110, the overcurrent prevention signal OCP is generated based the comparison between the output voltage Vocs the band-gap reference voltage BGR (step S110).

In operation S111, the inrush current may be reduced by using the first soft-start control method for decreasing the overcurrent limit level such that the switch current does not exceed the predetermined fixed current level irrespective of the pulse width modulation signal PWM from the control unit.

Referring back to operation S105, if the first signal Vo is greater than the reference voltage Vr (NO), the overcurrent control signal OCR is deactivated (Operation S107).

In operation S109, the inrush current may be reduced by using the second soft-start control method such that the reference voltage of the control unit 150 may be linearly increased such that a difference between the reference voltage Vr and the voltage of the output capacitor may be decreased.

Figure 11:
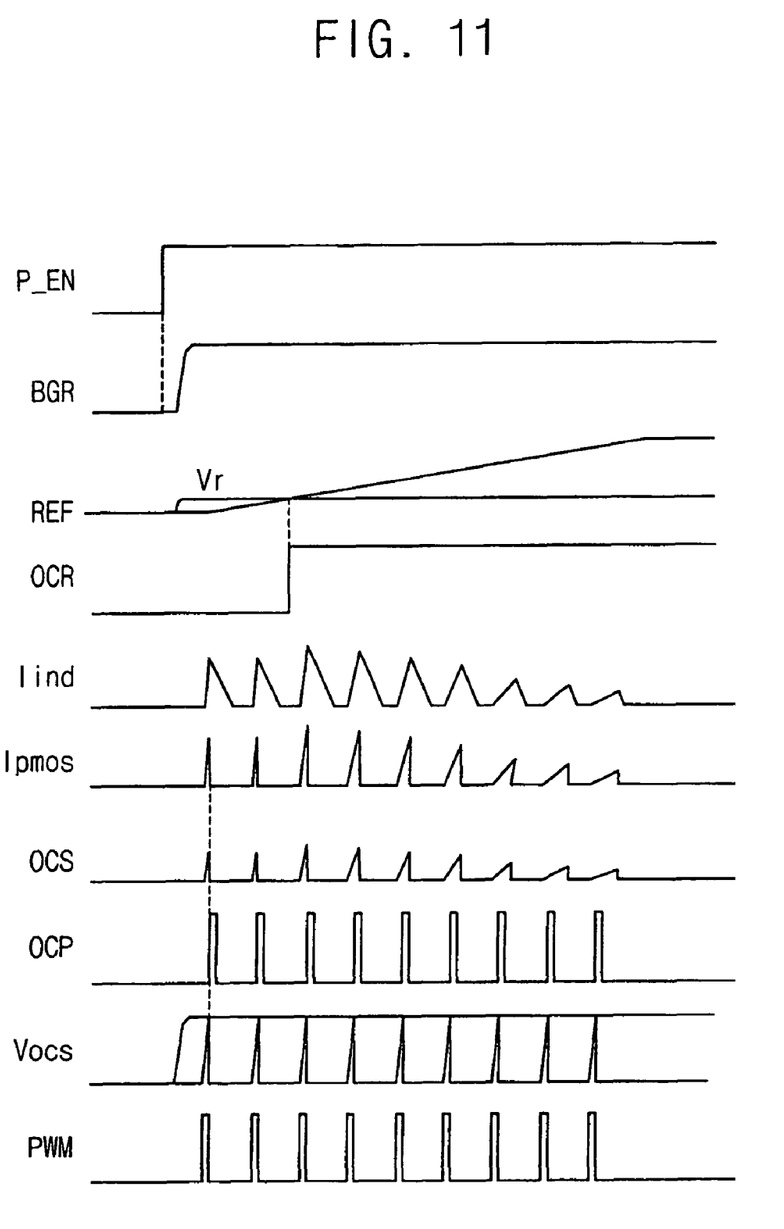
FIG. 11 is a timing diagram illustrating internal signals of the power conversion device of FIG. 1 according to the first example embodiment.

FIG. 11 is a timing diagram illustrating internal signals of the power conversion device 100 of FIG. 1 according to the first example embodiment. An operation of the power conversion device 100 according to the first example embodiment will be described with reference to FIGS. 1 to 7 and 11.

The reference voltage generating unit 110 may generate the band-gap reference voltage BGR and the reference voltage Vr in response to the power enable signal P_EN. For example, the reference voltage generating unit 110 generates the band-gap reference voltage BGR and the reference voltage Vr when the power enable signal P_EN transition from the logic low state ("0") to the logic high state ("1").

The lamp-up signal generating unit 120 may generate the first signal REF based on the band-gap reference voltage BGR. The first signal REF may linearly increase or decrease based on the band-gap reference voltage BGR. The slope of the first signal REF may be fixed.

The current sensing unit 170 may sense the current Ipmos flowing through the p-type power MOS transistor PMP in the power switch and driver circuit unit 160 to generate the current sensing signal OCS. The gain control unit 130 may convert the current sensing signal OCS to the voltage output Vocs. If the first signal REF is lower than the reference voltage Vr, the overcurrent control signal OCR may be the logic low state ("0"). Because the overcurrent sensing gain of the gain control unit 130 is increased, the output voltage Voc may approach a threshold voltage, even though a relatively small current flows through the gain control unit 130.

The overcurrent prevention signal generating unit 140 may compare the output voltage Vocs of the voltage generating unit 130a and the band-gap reference voltage BGR to generate the overcurrent prevention signal OCP.

The gate driver circuit 161 included in the power switch/driver circuit unit 160 may receive the overcurrent prevention signal OCP and converts the PMOS gate drive signal VGP to the logic high state ("1") irrespective of the pulse width modulation signal PWM. As a result, the p-type power MOS transistor PMP in the power switch/driver circuit unit 160 is turned off.

If the first signal REF is greater than the reference voltage Vr, the overcurrent control signal OCR may be the logic high state ("1"). For instance, the overcurrent sensing gain may be decreased such that the relatively large current flows through the p-type power MOS transistor PMP of the power switch and driver circuit unit 160. Accordingly, the output voltage Vocs may approach the threshold voltage and the overcurrent prevention signal OCP may be the logic high state ("1").

Figure 12:
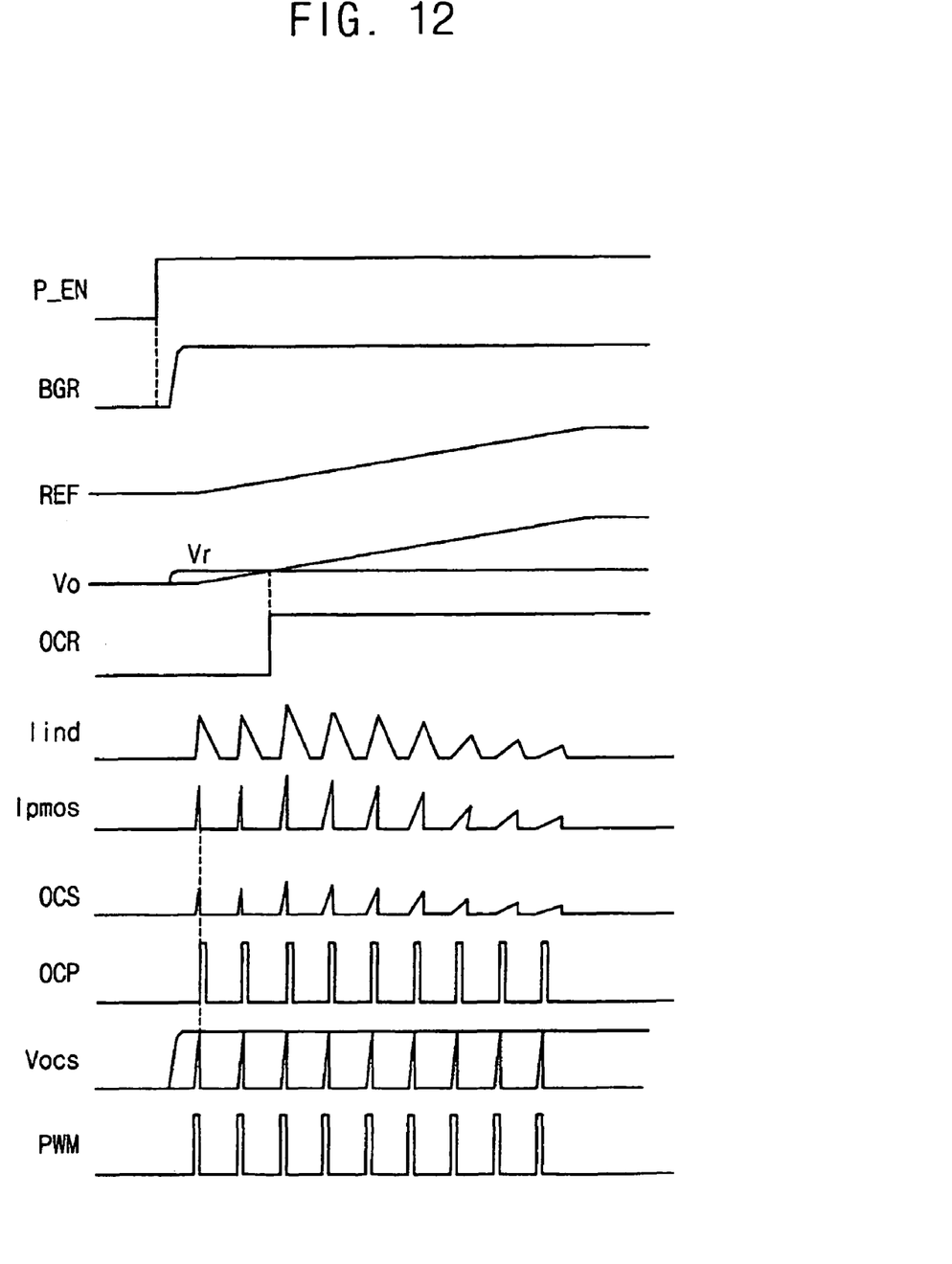
FIG. 12 is a timing diagram illustrating internal signals of the power conversion device of FIG. 8 according to the second example embodiment.

FIG. 12 is a timing diagram illustrating internal signals of the power conversion device 200 of FIG. 8 according to the second example embodiment. An operation of the power conversion device according to the second example embodiment will be described with reference to FIGS. 8 and 12.

According to the second example embodiment, the sensed output voltage Vo may be compared with the reference voltage Vr. If the output voltage Vo is lower than the reference voltage Vr, the overcurrent control signal OCR may be the logic low state ("0") such that the overcurrent sensing gain is increased. In contrast, if the output voltage Vo is greater than the reference voltage Vr, the overcurrent control signal OCR may be the logic high state ("1") such that the overcurrent sensing gain is decreased.

The remainder of the operations of FIG. 12 is similar to the operation described with reference to FIG. 11. Therefore, the details of which are omitted for the sake of brevity.

While example embodiments have been shown and described with reference to FIGS. 1 to 11, it will be understood by those skilled in the art that various changes in form and details may be made therein without departing from the spirit and scope of this disclosure.

What is claimed is:

1. A method of reducing an inrush current, the method comprising:
   generating a reference voltage;
   generating a first signal based on a level of internal voltage, the level of internal voltage being a band-gap reference voltage, the first signal linearly increasing or decreasing, wherein the slope of the first signal is fixed;
   comparing the first signal with the reference voltage to generate an output voltage; and
   controlling an overcurrent prevention function based on the comparison results and the band-gap reference voltage, wherein the controlling includes comparing the band-gap reference voltage and the output voltage.

2. The method of claim 1, wherein controlling the overcurrent prevention function comprises:
   varying an overcurrent sensing gain based on the comparison results between the reference voltage and the first signal.

3. The method of claim 2, wherein varying the overcurrent sensing gain comprises:
   increasing the overcurrent sensing gain if the first signal is lower than the reference voltage.

4. The method of claim 3, wherein an overcurrent limit is lowered such that a switch current does not exceed a fixed current level irrespective of a pulse width modulation signal.

5. The method of claim 2, wherein varying the overcurrent sensing gain comprises:
   decreasing the overcurrent sensing gain if the first signal is greater than the reference voltage.

6. The method of claim 5, wherein a reference voltage is linearly increased such that a difference between the reference voltage and a voltage of an output capacitor is decreased.

7. The method of claim 2, wherein varying the overcurrent sensing gain comprises:
   generating an output voltage based on the comparison results and a current sensing signal.

8. The method of claim 1, wherein the first signal has the fixed slope by converting the internal voltage.

9. The method of claim 1, wherein the reference voltage is generated based on the level of an internal voltage, and wherein the first signal is induced based on an overcurrent prevention signal.

10. An inrush current reducing device, comprising:
a reference voltage generating unit configured to generate a reference voltage;
a gain control unit configured to compare a first signal and the reference voltage to control an overcurrent sensing gain, the first signal linearly increasing or decreasing, wherein the slope of the first signal is fixed; and
an overcurrent prevention signal generating unit configured to control an overcurrent prevention function based on the comparison results of the gain control unit and a band-gap reference voltage,
wherein the overcurrent prevention signal generating unit is configured to compare the band-gap reference voltage and an output voltage of the gain control unit.

11. The inrush current reducing device of claim 10, wherein the gain control unit is configured to increase or decrease an overcurrent sensing gain based on the comparison results between the reference voltage and the first signal.

12. The inrush current reducing device of claim 10, wherein the gain control unit is configured to increase the overcurrent sensing gain when the first signal is lower than the reference voltage.

13. The inrush current reducing device of claim 12, wherein an overcurrent limit is lowered such that a switch current does not exceed a fixed current level irrespective of a pulse width modulation signal.

14. The inrush current reducing device of claim 10, wherein the gain control unit is configured to decrease the overcurrent sensing gain when the first signal is greater than the reference voltage.

15. The inrush current reducing device of claim 14, wherein a reference voltage is linearly increased such that a difference between the reference voltage and a voltage of an output capacitor is decreased.

16. The inrush current reducing device of claim 10, wherein the gain control unit generates an output voltage based on the comparison results and a current sensing signal.

17. The inrush current reducing device of claim 10, further comprising:
a lamp-up signal generating unit configured to generate the first signal by converting an internal voltage, wherein the reference voltage is generated based on a level of the internal voltage.

18. The inrush current reducing device of claim 10, further comprising:
an output voltage sensing unit configured to generate the first signal based on an output signal that is controlled by using the overcurrent prevention function, wherein the reference voltage is generated based on a level of an internal voltage.

19. A power conversion device for reducing an inrush current, the power conversion device comprising:
a reference voltage generating unit configured to generate a reference voltage and a band-gap reference voltage;
a lamp-up signal generating unit configured to generate a first signal based on the band-gap reference voltage;
a current sensing unit configured to generate a current sensing signal;
a gain control unit configured to compare the first signal and the reference voltage to control an overcurrent sensing gain and to generate an output voltage based on the comparison and the current sensing signal, the first signal linearly increases or decreasing, wherein the slope of the first signal is fixed;
an overcurrent prevention signal generating unit configured to control an overcurrent prevention function, wherein the overcurrent prevention signal generating unit compares the band-gap reference voltage and the output voltage of the gain control unit; and
a power switch and driver circuit unit configured perform a switching operation in response to gate drive signals, wherein the gate drive signals are based on the overcurrent prevention signal.

* * * * *